US00RE48567E

(19) United States
(12) Reissued Patent
Baker et al.

(10) Patent Number: US RE48,567 E
(45) Date of Reissued Patent: May 25, 2021

(54) DISPLAY SCREEN OR PORTION THEREOF WITH GRAPHICAL USER INTERFACE

(71) Applicant: Lutron Technology Company LLC, Coopersburg, PA (US)

(72) Inventors: Rhodes B. Baker, Bethlehem, PA (US); Erica L. Clymer, Northampton, PA (US); Benjamin F. Bard, Zionsville, PA (US)

(73) Assignee: Lutron Technology Company LLC, Coopersburg, PA (US)

(21) Appl. No.: 29/671,750

(22) Filed: Nov. 29, 2018

Related U.S. Patent Documents

Reissue of:
(64) Patent No.: Des. 772,910
Issued: Nov. 29, 2016
Appl. No.: 29/519,785
Filed: Mar. 8, 2015

(51) LOC (13) Cl. ..... 14-04
(52) U.S. Cl.
USPC ..... D14/486
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812
See application file for complete search history.

(56) References Cited

U.S. PATENT DOCUMENTS

D546,779 S * 7/2007 Mierta ..... D13/164
D592,225 S * 5/2009 Blankenship ..... D14/492
7,587,683 B2 * 9/2009 Ito ..... G06F 3/04817 455/566
D611,950 S * 3/2010 Fletcher ..... D14/488
D624,556 S * 9/2010 Chaudhri ..... D14/486
D649,125 S * 11/2011 Clymer ..... D13/174
D659,158 S * 5/2012 Clymer ..... D14/488
(Continued)

OTHER PUBLICATIONS

Crestron Electronics Inc., Crestron Mobile E-Control Mobility Solution, available at least as early as Mar. 2009.
(Continued)

*Primary Examiner* — Darlington Ly
(74) *Attorney, Agent, or Firm* — Saidman DesignLaw Group, LLC

(57) CLAIM

The ornamental design for a display screen or portion thereof with graphical user interface, as shown and described.

DESCRIPTION

*The file of this patent contains at least one drawing/photograph executed in color. Copies of this patent with color drawing(s)/photograph(s) will be provided by the Office upon request and payment of the necessary fee.*

[The sole FIGURE is] *FIG. 1 shows* a display screen or portion thereof with graphical user interface showing our new design; *and,*

*FIG. 2 is a second embodiment thereof.*

The peripheral dashed broken lines [represent] *illustrate* a display screen or portion thereof which forms no part of the claimed design.

1 Claim, 2 Drawing Sheets
(1 of 2 Drawing Sheet(s) Filed in Color)

Matter enclosed in heavy brackets [ ] appears in the original patent but forms no part of this reissue; matter printed in italics indicates the additions made by reissue.

*(AMENDED)*

(56) References Cited

U.S. PATENT DOCUMENTS

| | | | | | |
|---|---|---|---|---|---|
| D660,310 | S * | 5/2012 | Kim | D14/486 | |
| D687,050 | S * | 7/2013 | Matas | D14/486 | |
| D695,758 | S * | 12/2013 | Tagliabue | D14/486 | |
| D696,272 | S * | 12/2013 | Tagliabue | D14/486 | |
| D702,700 | S * | 4/2014 | Thompson | D14/485 | |
| 8,780,201 | B1 * | 7/2014 | Scalisi | H04N 7/186 | 348/143 |
| 8,866,343 | B2 * | 10/2014 | Abraham | G05D 23/1902 | 307/85 |
| D737,283 | S * | 8/2015 | Scalisi | D14/485 | |
| D746,849 | S * | 1/2016 | Anzures | D14/486 | |
| D757,802 | S * | 5/2016 | Kim | D14/489 | |
| D760,737 | S * | 7/2016 | Yoon | D14/485 | |
| D761,292 | S * | 7/2016 | Wiesner | D14/486 | |
| 9,384,491 | B1 * | 7/2016 | Briggs | H04W 4/02 | |
| D780,793 | S * | 3/2017 | Lemay | D14/486 | |
| D801,365 | S * | 10/2017 | Broughton | D14/486 | |
| D802,013 | S * | 11/2017 | Kluge | D14/488 | |
| D830,409 | S * | 10/2018 | Agarwal | D14/488 | |
| D847,174 | S * | 4/2019 | Agarwal | D14/486 | |
| D854,036 | S * | 7/2019 | Agarwal | D14/486 | |
| D866,588 | S * | 11/2019 | Agarwal | D14/486 | |
| D873,847 | S * | 1/2020 | Clymer | D14/487 | |
| D876,456 | S * | 2/2020 | Broughton | D14/486 | |
| 2010/0023865 | A1 * | 1/2010 | Fulker | H04L 67/025 | 715/734 |
| 2011/0266122 | A1 | 11/2011 | Zaharchuk et al. | H01H 9/18 | 200/308 |
| 2014/0380234 | A1 * | 12/2014 | Shim | G06F 3/0488 | 715/781 |
| 2015/0033136 | A1 * | 1/2015 | Sasaki | G06F 3/0482 | 715/736 |
| 2015/0188724 | A1 * | 7/2015 | Kim | H04N 21/4223 | 340/3.71 |
| 2015/0286388 | A1 * | 10/2015 | Jeon | G06F 3/0484 | 715/736 |

OTHER PUBLICATIONS

Crestron Electronics Inc., Prodigy System User Guide, available at least as early as Mar. 8, 2015.

Crestron Electronics Inc., Prodigy System User Guide Crestron $PTX_3$, available at least as early as Mar. 8, 2015.

Julie Jacobson, CEPro $Control_4$, InfinityEdge Priced, Designed Like iPad, <http://www.cepro.com/article/control4_infinityedge_priced_designed_like_ipad/>, available on Aug. 10, 2010.

Lutron Technical Support, $RadioRA^2$—Lutron Home Control+ App for the Apple iPad, iPhone, and iPod.touch, Revision F, available at least as early as Mar. 8, 2015.

Lutron Electronics Co., Inc., Quantum Green Glance Brochure, available at least as early as Nov. 2007.

Home Automation, Inc., OmniTouch 5.7 Touchscreen with Video User's Guide, available at least as early as Jun. 2007.

Crestron Electronics Inc., Prodigy Brochure, available at least as early as Mar. 8, 2015.

* cited by examiner

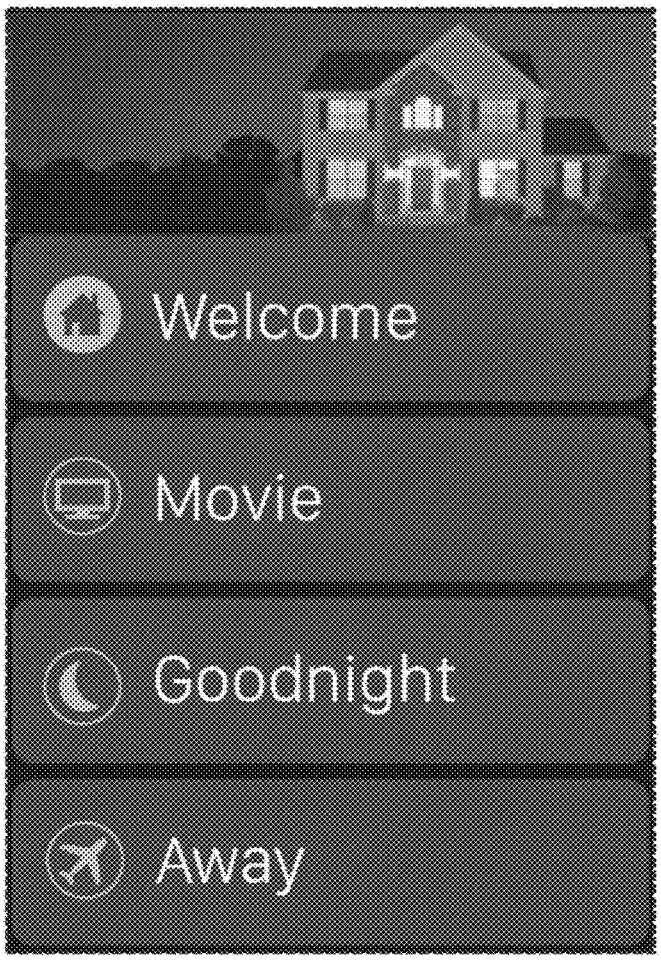
FIG. 1
*(AMENDED)*

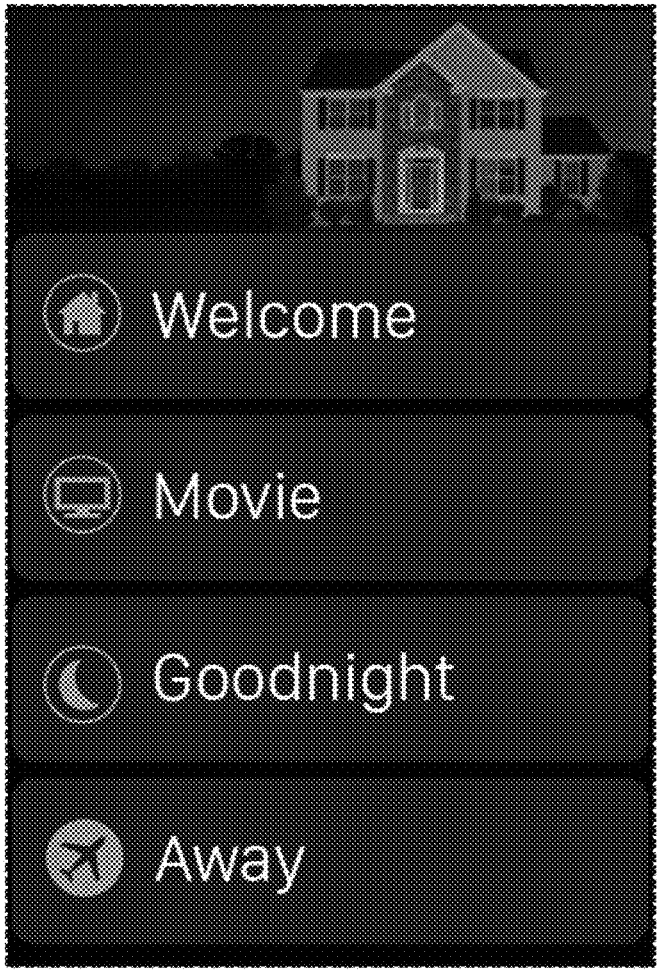
FIG. 2
*(NEW)*